Nov. 28, 1967

J. W. HILE ET AL 3,355,371

METHOD OF ANODIZING A METAL IN A PLASMA INCLUDING CONNECTING SAID METAL IN A SEPARATE ELECTRICAL CIRCUIT

Filed June 29, 1964

INVENTORS
John W. Hile &
BY Matthew C. McKinnon
Peter P. Kozak
ATTORNEY

United States Patent Office 3,355,371
Patented Nov. 28, 1967

3,355,371

METHOD OF ANODIZING A METAL IN A PLASMA INCLUDING CONNECTING SAID METAL IN A SEPARATE ELECTRICAL CIRCUIT

John W. Hile, Royal Oak, and Matthew C. McKinnon, Warren, Mich., assignors to General Motors Corporation, Detroit, Mich., a corporation of Delaware
Filed June 29, 1964, Ser. No. 378,760
7 Claims. (Cl. 204—164)

ABSTRACT OF THE DISCLOSURE

This invention relates to a process for forming a thin, high purity oxide film of a precisely controlled thickness on an oxidizable substrate in a reduced oxygen pressure environment. In this process an oxidizable substrate is first placed between a cathode and an anode and the pressure of the oxygen environment surrounding the substrate is reduced to less than 1000 microns of mercury. A low voltage is applied across the oxidizable substrate and then a high voltage is applied across the cathode and the anode. The application of the high voltage causes the oxidizable substrate to be immersed in a glow discharge. The thickness of the oxide film which is formed in seconds is determined by the voltage applied across the oxidizable substrate.

This invention relates to the formation of oxide films on metals, and more particularly to the controlled growth of oxide films on oxidizable substrates by means of an activated oxygen plasma oxidation process.

Micro-miniature electronic systems based on electronic devices comprising a thin oxide film formed on a metal substrate have been greatly handicapped by the lack of methods for the formation of pure, thin, oxide films of a precisely controlled thickness on metal layers. For example, the use of tunnel emission devices which require insulating film barriers 10 to 50 Angstroms thick has been hindered by lack of suitable means for forming high purity oxide films of the required thickness on metals. Presently, there are a number of methods available for forming oxide films on metals; however, none of these methods are suitable for applying oxide films on all of the metals commonly used in tunnel emission devices or the like. The wet anodizing method which is widely used to apply thin films has the advantage of excellent control of film thickness; however, being a wet method, impurities frequently are introduced into the oxide structure causing undesirable effects. The method of growing oxides in an air atmosphere yields high purity films, but this method does not permit sufficient control of layer thickness. The sputtering method of forming oxide films is satisfactory for thick films but it is not suitable for thin films because it lacks sufficient control of layer thickness. The oxygen plasma method yields a high purity film, but this method requires so much time that is not economical.

A basic object of this invention is to provide a process for the production of a thin, high purity oxide film on a metal in which one can precisely control the thickness of the oxide film layer. Another object of this invention is to provide a versatile method for the production of thin oxide films on all metals which form oxides which are insulators or conductors.

These and other objects are accomplished by a process comprising the steps of positioning a thin layer of the metal to be coated in the path of a glow discharge effected by the application of a high voltage between an anode and a cathode in a reduced oxygen pressure environment while simultaneously applying a low voltage across said metal layer.

It is still another object of this invention to provide a process in which the oxide film is formed in seconds, thereby making the oxide film thickness essentially independent of the process time. It is yet another object of this invention to provide a process for the production of thin oxide films in which the oxide film thickness is dependent entirely upon the external voltage applied across the metal.

Further objects and advantages of the invention will be prepared from the following detailed description, reference being made to the accompanying drawings wherein a preferred embodiment of the invention is shown.

Figure 1:
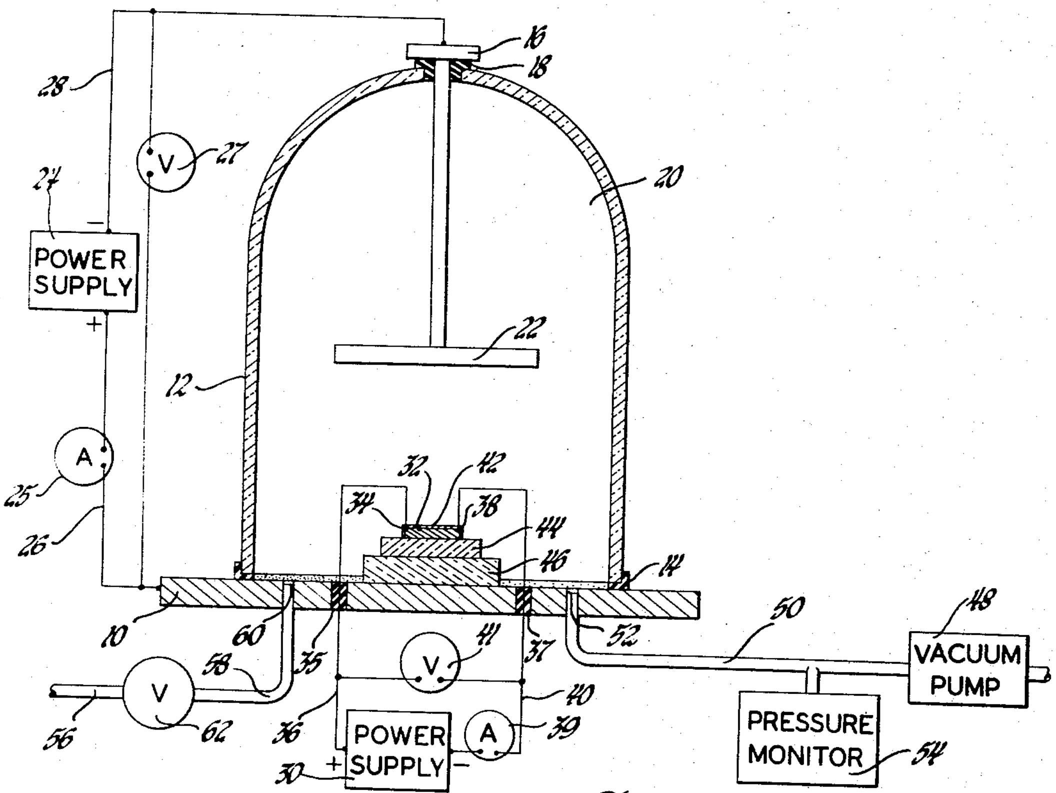
FIGURE 1 is a schematic cross sectional view showing an apparatus contemplated by the invention as useful in forming a thin, high purity oxide layer of a precisely controlled thickness on a metal.

This invention comprehends the controlled formation of an oxide film on a metal layer by a process which may be effected by means of the apparatus schematically indicated in FIGURE 1. This apparatus has a base plate 10 which serves as the anode. The base plate may be of aluminum or of any suitable metal. A glass bell 12 is positioned on the base plate 10 and sealed with respect thereon by means of the seal 14 which makes the connection air tight. An electrode support 16 is connected to glass housing 12 by means of seal 18 which makes the connection air tight. The base plate 10, the seal 14, the glass housing 12, the seal 18, and the electrode support 16 form a closed vacuum chamber 20.

A cathode 22 is electrically connected to the electrode support 16. The cathode may be aluminum metal, which has a high tolerance for sputtering, or any other suitable metal, preferably one which has a high tolerance for sputtering.

The power supply source 24 is connected to the anode base plate 10 through the electrical lead 26 and to the upper electrode support 16 through the electrical lead 28. The power supply source 24 is a relatively high voltage direct current power supply which is reversible in polarity. The current in this circuit is measured with ammeter 25 which is connected in series with lead 26 and the voltage in this circuit is measured with voltmeter 27 in parallel with leads 26 and 28.

Figure 2:
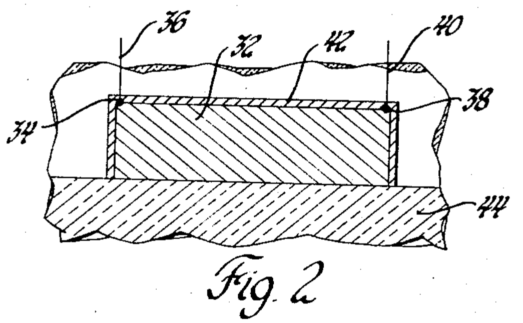
FIGURE 2 is an enlarged portion of FIGURE 1 showing the relative positions of the glass support, the metal layer, the oxide layer and the electrical contacts on the metal layer.

Positioned on the anode or base plate 10 is a permanent glass support 46 which carries a removable glass support 44. The glass support 46 also serves to shield the glass support 44 from the base plate 10. The glass support 44 holds the metal layer 32 on which the oxide film 42 is formed as will be hereafter described. The metal layer 32 is electrically isolated from the anode 10 and the cathode 22. The power supply source 30 is connected to the metal layer 32 to be oxide coated at contact 34 through the electrical lead 36 which passes a seal plug 35 of the base plate 10. The power supply source 30 is connected to opposite ends of the metal layer 32 at 38 through the electrical lead 40 which passes through the base plate 10 by means of seal plug 37. The relative positions of the glass support 44, the metal layer 32, the oxide film 42, contact points 34 and 38, and electrical leads 36 and 40 are more clearly shown in FIGURE 2. The power supply source 30 is a relatively low voltage direct current power supply which is reversible in polarity. The current in this circuit is measured with ammeter 39 which is connected in series with lead 40 and the voltage in this circuit is measured with voltmeter 41 in parallel with leads 36 and 40.

Evacuation of the chamber 20 is accomplished by a vacuum pump 48 which communicates with the chamber 20 by means of a tube 50, and aperture 52 in the case plate 10. The pressure monitor 54, which is connected to tube 50, indicates the pressure in the vacuum chamber 20.

Means for introducing a selected gas into the chamber 20 is provided which consists of a storage tank of the gas (not shown) connected to the aperture 60 of the base plate 10 through the conduit 56, the bleed valve 62 and the conduit 58. Concurrent utilization of pressure monitor 54 and bleed valve 62 permit accurate regulation of the pressure in the chamber while bleeding in the gas.

The following description of the manner in which the apparatus shown in FIGURE 1 is used to control the growth of the formation of an aluminum oxide film upon a layer of aluminum metal also describes the process of our invention. Before the oxidation of the aluminum film 32 is performed in the apparatus described above, it is necessary to perform certain preliminary operations. Special attention must be placed on the conditioning of the glass support 44 in order to insure uniformity of deposit films. Microscope cover glass slides or polished quartz form satisfactory supports. The support is cleaned in hot deionized water containing a detergent. This can be accomplished effectively by vibrating the support in the detergent solution at ultrasonic frequencies. After the support is rinsed and dried with non-scratching paper, it is examined for scratches and water marks. The final conditioning step for the glass support 44 is a further cleaning by the sputtering technique. In the sputtering method a relatively high voltage is applied in an electrical circuit having a cathode and an anode under a reduced atmosphere. When the voltage is first applied, contaminants on the cathode are vaporized. Application of the voltage for a longer time results in the cathode metal being vaporized. The sputtering technique step is performed when the support 44 is positioned on the glass support 46 in the vacuum chamber 20. The chamber is evacuated by means of a vacuum pump 48 to a pressure of 100 microns of mercury as indicated by pressure monitor 54. The polarity of the power supply 24 circuit is reversed so that base plate 10 becomes the cathode. Glass support 44 is in close enough proximity to the base plate 10 cathode so that it is effected by the voltage in the same manner as the cathode is. A power of 1,000 volts and 100 milliamperes are applied for 10 minutes, thereby removing any remaining contaminants from support 44.

The metal layer 32 on the glass support 44 may be formed in any suitable manner, for example, by the so called sputtering method or by one of the several existing thermal-evaporation techniques. When the aluminum metal layer is formed by the sputtering method, the aluminum cathode 22 is subjected to a voltage of approximately 2,000 volts and a current density of 5 milliamperes per square centimeter for a time period of approximately 40 minutes while the chamber 10 has an inert gas pressure of 100 microns of mercury. This method removes aluminum metal from the aluminum cathode 22 by vaporizing it and deposits it on the glass support 44.

The inert gas atmosphere is obtained by the following procedure. The chamber 20 is preferably evacuated by the vacuum pump to a pressure below about 100 microns of mercury. The inert gas such as argon is bled into the chamber until the pressure is raised to almost atmospheric pressure. The chamber is then evacuated once again to a pressure below 100 microns of mercury and argon bled into the chamber until the desired pressure is obtained.

In this manner the chamber is purged of contaminating gases and a substantially pure argon atmosphere can be obtained. The chamber can be repeatedly purged in this manner to obtain an even purer argon atmosphere. The number of purgings that may be desired, of course, depends upon the pressure to which the chamber is evacuated before the argon is introduced. The lower the evacuation pressure, the greater the effectiveness of the purging. When the chamber is evacuated to a pressure of below about 10 microns of mercury before the argon is bled in, only one purging may be required.

It is necessary to carry out the sputtering method of forming a metal layer in an inert atmosphere in order to insure that a pure metallic layer is formed. A metallic oxide film would be formed if oxygen was present in the atmosphere. The sputtering method of applying a metal layer works satisfactorily when a relatively thick film is desired, for instance a thickness of 500 Angstroms or more. It is preferable that the metal be formed in the same system or chamber that is planned to be used for the formation of the oxide film. However, the metal layer may be formed in another system or chamber and stored under methanol until one is ready to grow the oxide layer.

The controlled formation of oxide layer by the activated oxygen plasma process may commence once a suitable layer of aluminum has been positioned on the glass support 44 in the vacuum chamber 20. After the metal film has been formed the power supply 30 circuit is then connected to the opposite ends of the aluminum metal layer 32. The contact 38 is the cathode in this circuit and the contact at 34 is the anode according to the polarity as indicated in FIGURE 1. The contacts at 34 and 38 can be made with a pressure contact, welding, soldering, or any conventional method. Once the contacts have been made to the aluminum metal layer the pressure in the chamber 20 is reduced by the steps described above and a reduced oxygen atmosphere is established. An oxygen pressure of approximately 100 microns of mercury is used. This pressure can be varied from 1 micron to 1,000 microns of mercury, the pressure within this range not being critical.

The power supply 30 voltage is applied across the metal layer in order to stabilize the system. The thickness of the oxide layer is determined by the power supply 30 potential that is applied, the greater the potential the thicker the oxide layer. The potential that is applied from power supply 30 ranges from 0.1 to 15 volts. It should be noted that the voltage at the cathode 38 is the same as the power supply 30 voltage that is applied in the circuit. The other end of the metal layer, the contact point 34 being the anode, has a zero voltage; thus, there is a voltage drop across the metal layer from contact point 38 to contact point 34. As soon as the system has stabilized, that is, the current does not drift, the power supply 24 circuit is actuated.

In the case of aluminium, power supply 24 circuit is initiated with a potential of 500 volts. Care must be exercised in the amount of potential that is applied. If the potential is too high, sputtering takes place instead of the desired oxygen glow plasma phenomena. An oxygen glow plasma phenomena occurs when an electric field of the proper magnitude is subjected to an oxygen atmosphere. The oxygen thereby becomes a gaseous electrolyte and is commonly referred to as an oxygen glow discharge or an oxygen glow plasma phenomena. In sputtering the metal from the cathode, aluminum in this case, would be deposited as an oxide on the sample film due to the presence of the oxygen instead of the inert gas. Sputtering, of course, results in a much thicker film than is desired in this application. An oxygen glow plasma phenomena can be obtained with an aluminum cathode when the potential ranges from 400 to approximately 1,000 volts. A potential of 1,000 volts or higher results in sputtering of the aluminum cathode. Sputtering occurs at different potentials for different metals. Preferably, the potential which causes sputtering for a particular metal is determined and a corresponding lower potential is used to obtain the oxygen glow plasma discharge. The growth of the metal oxide film takes place in the first few seconds after the power supply 30 is initiated. As the oxide film grows, the current in the power supply 30 circuit decreases sharply. In the case of aluminum, the current in the power supply 30 circuit decreases from 1 milliampere to 0.1 milliampere after the first few seconds. The current thereafter will gradually decrease to 0.05 milliampere. Most of the growth, however, occurs in the first two or three seconds. The rate the aluminum oxide layer grows is 30 Angstroms per volt applied in the power supply 30 circuit as is indicated in Table I.

TABLE I.—ALUMINUM OXIDE LAYER FORMATION DATA

| Sample No. | Power Supply 24 Voltage | Power Supply 30 Voltage | Starting Al Layer Thickness, A. | Oxide Thickness, A. | |
|---|---|---|---|---|---|
| | | | | ΔR | Anodizing |
| 1 | 600 | 1 | 400 | 30 | 32 |
| 2 | 600 | 1 | 450 | 32 | 35 |
| 3 | 600 | 2 | 305 | 44 | 65 |
| 4 | 800 | 3 | 350 | 90 | 84 |

As a result, a thin, high purity oxide coating of any desired thickness ranging from 10 to 300 Angstroms can be easily obtained by choosing the necessary voltage. Since the voltage can be controlled precisely, the thickness of thin metallic oxide film can be controlled precisely.

It is noted that power supply 24 and power supply 30 must both be operated simultaneously in order to effect the desired process. When power supply 24 alone is activated, the oxygen plasma phenomena very slowly oxidizes the metal layer; however, when both the power supply 24 and the power supply 30 which applies voltage directly across the metal layer are activated, the oxidation process proceeds in seconds to completion.

The oxide film thickness may be determined by a number of methods. One method consists of measuring the change in the resistance of the metal layer and calculating change in the thickness of the oxide film. The oxide film thickness is proportional to the change in resistance. Another method consists of placing the oxidized film in a wet anodizing bath and noting the voltage at which the current flows through the bath. From the relation $V \times 14$ A./volt$=d$, the barrier thickness can be calculated. Still another method which can be used is the method of evaporating a counter electrode over the oxide film to form a parallel plate capacitor. By measuring the capacitance of the structure, the thickness $d$ of the dielectric in centimeters can be calculated from the relation $d=\epsilon\epsilon_0 A/C$ where C is the capacitance in farads, $\epsilon$ is the relative dielectric constant for the particular oxide layer, A is the area in square centimeters, and $\epsilon_0$ the dielectric constant of free space.

This oxide film formation process may be applied to metals whose oxides are either insulators, as is the case with aluminum, as well as metals whose oxides are semiconductors as is the case with titanium. In the case of titanium metal, the oxide layer grows at the rate of 20 Angstroms per volt applied across the metal. Since titanium oxide is a semi-conductor, it is preferable to have a somewhat thicker oxide layer. A layer 165 Angstroms thick was obtained when 8 volts was applied. In general, the oxide layer thickness is precisely controlled by varying the voltage applied across the metal.

An oxide layer was grown on tantalum at the rate of 20 Angstroms per volt. In this case, an oxide layer 200 Angstroms thick was obtained when 10 volts was applied across the metal.

This method can be applied to a wide variety of anodizable metals and semi-conductors, including magnesium, chromium, antimony, bismuth, beryllium, geranium, and silicon, as well as others.

Figure 3:
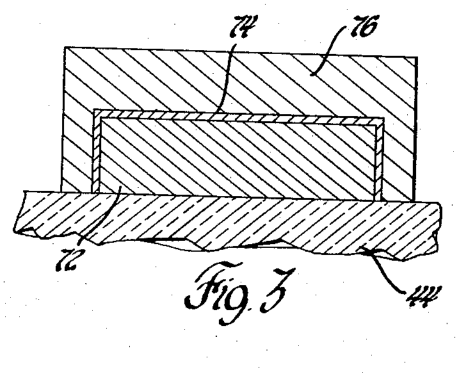
FIGURE 3 is a schematic cross sectional view showing the relative position of the oxide film in a diode.

FIGURE 3 is a schematic cross sectional view of a typical diode such as an aluminum-aluminum oxide-aluminum diode. The base 72 is an aluminum layer 3,000 Angstroms thick positioned on a glass support 44. The oxide film 74, which has been obtained by the subject process, is approximately 20 to 50 Angstroms thick. The emitter 76 is an aluminum layer 3,000 Angstroms thick.

Figure 4:
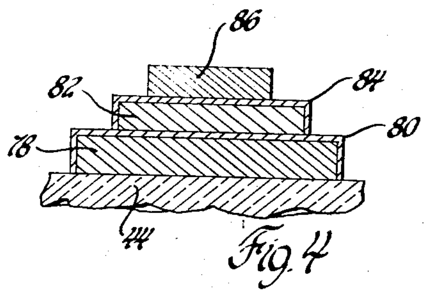
FIGURE 4 is a schematic view showing the relative position of the two oxide films in a triode.

FIGURE 4 is a schematic cross sectional view of a hot electron triode which contains two oxide films which were obtained by the subject process. An aluminum collector 78, 3,000 Angstroms thick, an aluminum base 82, 30 to 50 Angstroms thick, and an aluminum emitter 86, 3,000 Angstroms thick, were separated by two aluminum oxide films, 80 and 84, 70 Angstroms thick and 15 to 50 Angstroms thick, respectively. The aluminum collector 78 was positioned on a glass support 44.

While the invention has been described in terms of specific examples, it is to be understood that the scope of the invention is not limited thereby except as defined in the following claims.

We claim:

1. A process for the formation of a thin, high purity oxide film of a precisely controlled thickness on an oxidizable substrate comprising the steps of positioning said oxidizable substrate between and electrically isolated from a cathode and an anode, reducing the oxygen pressure environment surrounding said oxidizable substrate to a pressure ranging from about 1 to 1000 microns of mercury, applying a low voltage in a first circuit ranging from about 0.1 to 15 volts across said oxidizable substrate, and applying a high voltage in a second circuit ranging from about 400 to 1000 volts across said cathode and said anode whereby said oxidizable substrate is immersed in a glow discharge, said low voltage determining the thickness of said oxide film.

2. A process as described in claim 1 whereby said step of positioning said oxidizable substrate between a cathode and an anode is performed by thermally evaporating a charge of pure material through a suitable mask at a reduced pressure in the vacuum chamber.

3. A process as described in claim 1 whereby said step of positioning said oxidizable substrate between a cathode and an anode is performed by means of a sputtering process in an inert gas atmosphere having a pressure of about 100 microns of mercury at a voltage of about 2000 volts and a current density of about 5 milliamperes per square centimeter.

4. A process for the formation of a thin, high purity oxide film of a precisely controlled thickness on an anodizable metal film comprising the steps of positioning said metal film between and electrically isolated from a cathode and an anode, reducing the oxygen pressure environment surrounding said metal film to a pressure ranging from about 1 to 1000 microns of mercury, applying a low voltage in a first circuit ranging from about 0.1 to 15 volts across said metal film, and applying a high voltage in a second circuit ranging from about 400 to 1000 volts across said cathode and said anode whereby said metal film is immersed in a glow discharge, said low voltage determinating the thickness of said oxide film.

5. A process for the formation of a thin, high purity oxide film of a precisely controlled thickness on an anodizable electrical conductor comprising the steps of positioning said electrical conductor between and electrically isolated from a cathode and an anode, reducing the oxygen pressure environment surrounding said electrical conductor to a pressure ranging from about 1 to 1000 microns of mercury, applying a low voltage in a first circuit ranging from about 0.1 to 15 volts across said electrical conductor, and applying a high voltage in a second circuit ranging from about 400 to 1000 volts across said cathode and said anode whereby said electrical conductor is immersed in a glow discharge, said low voltage determinating the thickness of said oxide film.

6. A process for the formation of a thin, high purity oxide film of a precisely controlled thickness on an anodizable electrical semiconductor comprising the steps of positioning said electrical semiconductor between and electrically isolated from a cathode and an anode, reducing the oxygen pressure environment surrounding said semiconductor to a pressure ranging from about 1 to 1000 microns of mercury, applying a low voltage in a first circuit ranging from about 0.1 to 15 volts across said semiconductor, and applying a high voltage in a second circuit ranging from about 400 to 1000 volts across said cathode and said anode whereby said semiconductor is immersed in a glow discharge, said low voltage determining the thickness of said oxide film.

7. A process for the formation of a thin, high purity aluminum oxide film of a preferred controlled thickness on an aluminum film, the thickness of said oxide film ranging from 10 Angstroms to 300 Angstroms, comprising the steps of positioning said aluminum film between and electrically isolated from a cathode and an anode, reducing the oxygen pressure environment surrounding said aluminum film to a pressure ranging from about 1 to 1000 microns of mercury, applying a low voltage in a first circuit ranging from about 0.1 to 15 volts across said aluminum film, and applying a high voltage in a second circuit ranging from about 400 to 1000 volts across said cathode and said anode whereby said aluminum film is immersed in a glow discharge, said low voltage determining the thickness of said oxide film.

References Cited

UNITED STATES PATENTS 3,148,129 9/1964 Basseches et al. ------ 204—42

OTHER REFERENCES

A.P.C. application of Berghaus et al., Ser. No. 283,312, published May 18, 1943.

Miles et al.: Journal of the Electrochemical Society, December 1963, vol. 110, No. 12, pp. 1240–1245.

Miles et al.: J. of the Electrochemical Society, vol. 110, No. 3, p. 58c, abstract 83 of Paper No. 3 given of Pittsburgh meeting of said society held Apr. 15–18, 1963 (March 1963).

ROBERT K. MIHALEK, *Primary Examiner.*

JOHN H. MACK, *Examiner.*